United States Patent [19]

Aoki

[11] 4,303,381
[45] Dec. 1, 1981

[54] DEVICE FOR SETTING A BASE CUP IN A BLOW MOLD

[76] Inventor: Katashi Aoki, 6037, Ohaza Minamijo, Sakakimachi, Hanishina-gun, Nagano-ken, Japan

[21] Appl. No.: 147,116

[22] Filed: May 6, 1980

[30] Foreign Application Priority Data

May 10, 1979 [JP] Japan .................................. 54-57298

[51] Int. Cl.³ .......................... B29C 17/07; B29D 3/00
[52] U.S. Cl. .................................... 425/503; 264/511; 264/516; 425/116; 425/125; 425/525
[58] Field of Search ............... 425/503, 525, 541, 116, 425/125, 522; 264/511, 516; 156/285, 287, 538

[56] References Cited

U.S. PATENT DOCUMENTS 3,318,985 5/1967 Turner et al. .................... 425/116 X
3,973,888 8/1976 Henl ..................................... 425/125

FOREIGN PATENT DOCUMENTS 2613735 10/1977 Fed. Rep. of Germany ...... 264/516

*Primary Examiner*—Jan H. Silbaugh
*Attorney, Agent, or Firm*—Fulwider, Patton, Rieber, Lee & Utecht

[57] ABSTRACT

The present invention relates to a device for setting a base cup in a blow mold, comprising a pair of divided molds disposed on a machine base and transversely movable for opening and closing and a bottom mold disposed at the bottom of these divided molds; further comprising a horizontal stationary plate secured to the machine base, a carrier capable of reciprocal movement on said stationary plate, and a base body of said bottom mold vertically movably disposed on said carrier, said stationary plate being disposed so as to move beyond the machine base for displacing said bottom mold and said carrier from the center of said blow mold to the outside of said machine base, guiding members being disposed at necessary positions in a drive device for displacing said carrier, said carrier having members for vertically moving said bottom mold at the bottom of said divided molds, a base body being disposed in association with a lifting device, and said carrier and said drive device comprising a transfer device by being connected together by a reciprocating member.

5 Claims, 7 Drawing Figures

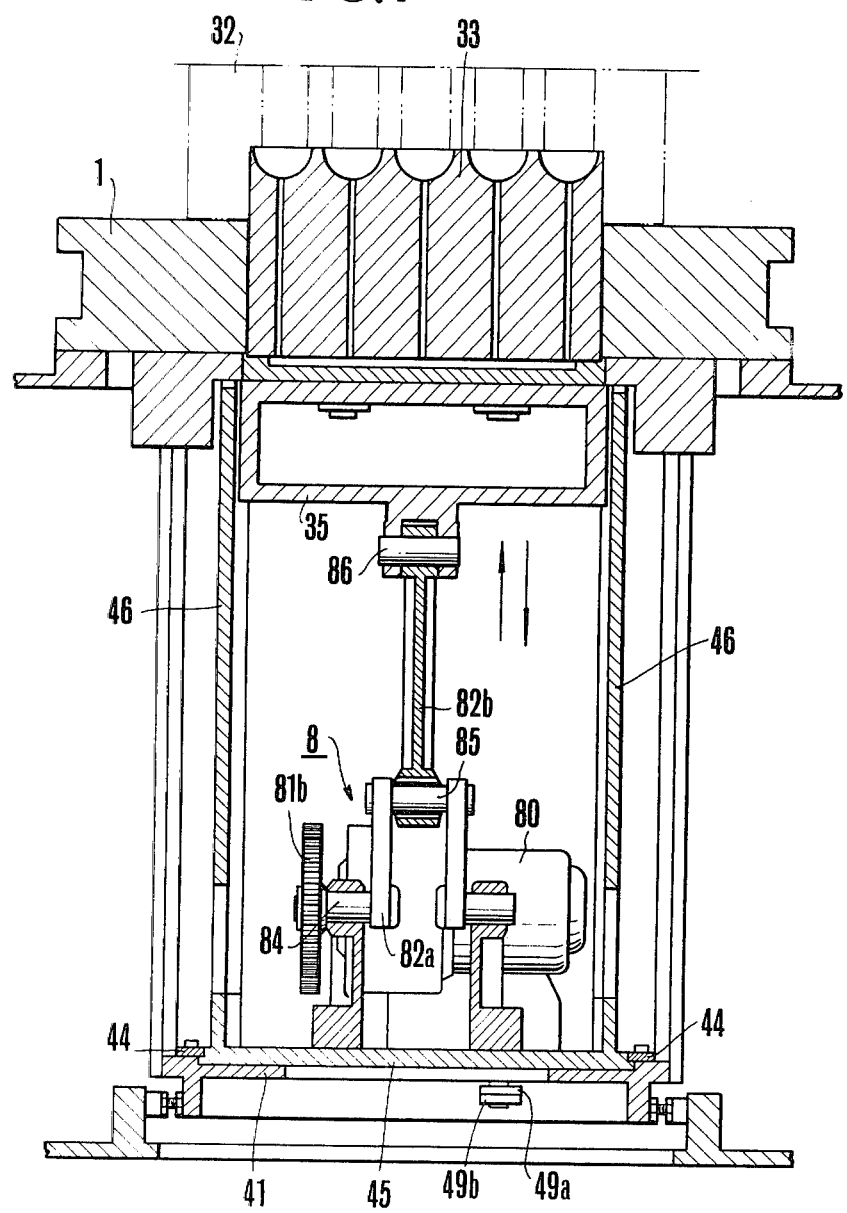

DEVICE FOR SETTING A BASE CUP IN A BLOW MOLD

BACKGROUND OF THE INVENTION

There are various kinds of synthetic resin containers, and they are designed according to their intended use. Various methods for molding these containers are also suggested: a method in which the bottom of an extruded parison is pinched off for air blowing so as to prepare a hollow molded article such as a bottle; a method in which an injection molded parison with a bottom is directly air blown to obtain a hollow molded article; a method in which an injection molded or an extruded parison is temperature adjusted and axially stretched thereafter for air blowing; and so on.

In any of these methods, the bottom of a synthetic resin container can easily break due to irregular thickness distribution. In considering a container for a material under pressure such as carbonated water, the container should not break nor deform anywhere when sealed and under an internal pressure of 3.5 kg and a temperature of 55° C. The container should not deform, and should be shaped so that cleaning of the interior is easy.

It is considered difficult, in general, to mold a container of a thermoplastic synthetic resin without adopting a special shape and still satisfy these conditions. A container which is improved with respect to strength and which is manufactured by the stretching and blow molding method cannot achieve this due to deformation at the bottom.

This bottom deformation is due to the fact that the thickness of the bottom is as small as 0.2–0.5 mm, and the bottom is flexible although it is rigid to a certain extent. The bottom protrudes internally for better stability but is pressed outward and expanded by the internal pressure. However, a synthetic resin container is convenient for carbonated water due to its light weight and ruggedness. Currently, the bottom is often expanded radially outward so that its rounded bottom will no longer be deformed by the internal pressure. Then, since the container cannot stand as it is, a base cup of a synthetic resin is attached to the bottom.

This attachment of the base cup manufactured separately is performed by painting an adhesive to the bottom of a container obtained by blow molding. Pressure is exerted while the adhesive hardens. If the base cup is attached without exerting pressure, the container floats on the adhesive and thickness of the adhesive layer becomes irregular, resulting in variations in the height of the containers. Although this height difference is small, problems arise when the containers are put on the filling line. This is undesirable in a system wherein the molding and filling of containers are performed in a continuous manner. Thus, the adhesion often had to be performed manually, and a special adhering device was required for this.

For attachment of the base cup without using an adhesive, the known insert method may be utilized. However, it is considered practically impossible, due to the position of the blow mold, to set a base cup at the bottom mold of the blow mold of a molding machine which performs injection molding and blow molding of a parison. Thus, a special device is generally required to set a base cup at the bottom mold within the series of molding cycles.

SUMMARY OF THE INVENTION

The present invention has been made to overcome these problems and provides a device which comprises a means for transferring the bottom mold of a molding machine to the outside while opening the blow mold, and a lifting means for setting and positioning the base cup and the bottom mold in the blow mold. This blow mold consists of a pair of divided molds so that the setting of the base cup can be performed outside of the molding machine.

The transfer means has a carrier which is displaced transversely by a reciprocating mechanism such as a crank arm or a link. The bottom mold of the blow mold reciprocates between the position immediately below the blow mold and the outside of the molding machine by this carrier. The carrier or a stationary plate has a part which guides the bottom mold in the vertical direction. The bottom mold thus vertically reciprocates between the blow mold and the transferred position. The movement of the bottom mold is effected by the action of an oil hydraulic cylinder, an air cylinder or a crank arm which is disposed in the carrier or the stationary part. When the bottom mold is at its extreme lower end, the transfer means operates with the help of the carrier to transfer the bottom mold outside the molding machine and to set the base cup in the molding part formed in the bottom mold.

BRIEF DESCRIPTION OF THE DRAWINGS

FIG. 1 is a vertical sectional view illustrating the case when the mold is opened;

FIG. 2 is a sectional view along the line II—II of FIG. 1;

FIG. 3 is a sectional view along the line III—III of FIG. 1;

FIG. 4 is a vertical sectional view illustrating the case when blow molding is performed; and FIG. 5 is a vertical sectional view illustrating the case when the base cup is set.

FIG. 7 is a sectional view along the line VII—VII of FIG. 6.

DETAILED DESCRIPTION OF THE INVENTION

Figure 1:
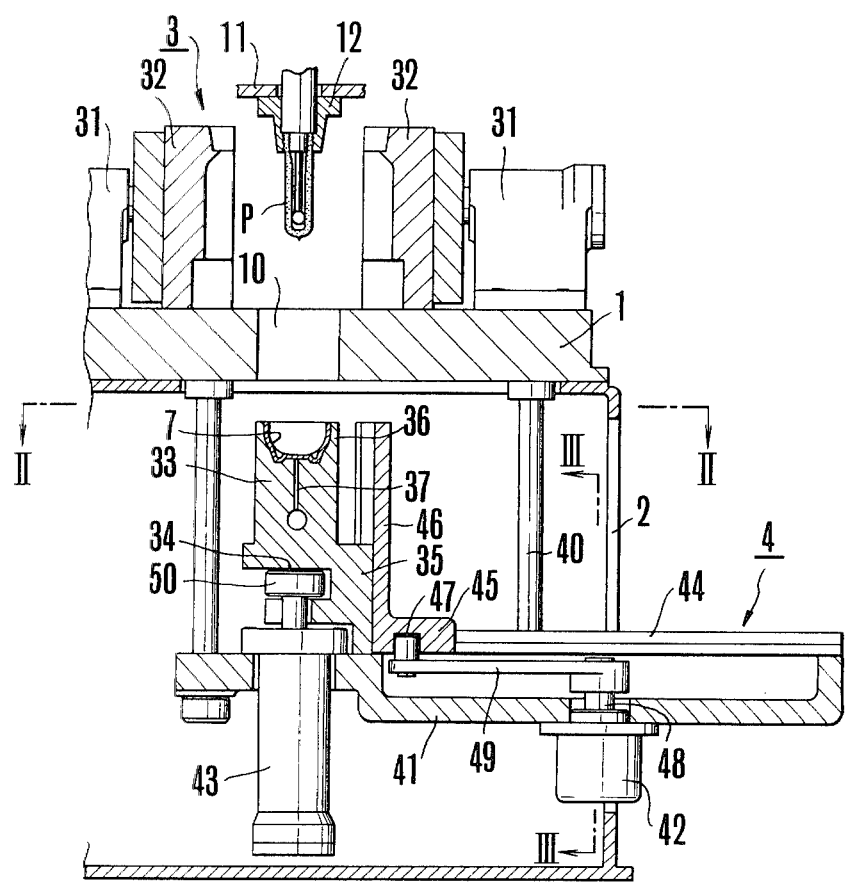
FIGS. 1–5 show the first embodiment of the present invention.
Figure 2:
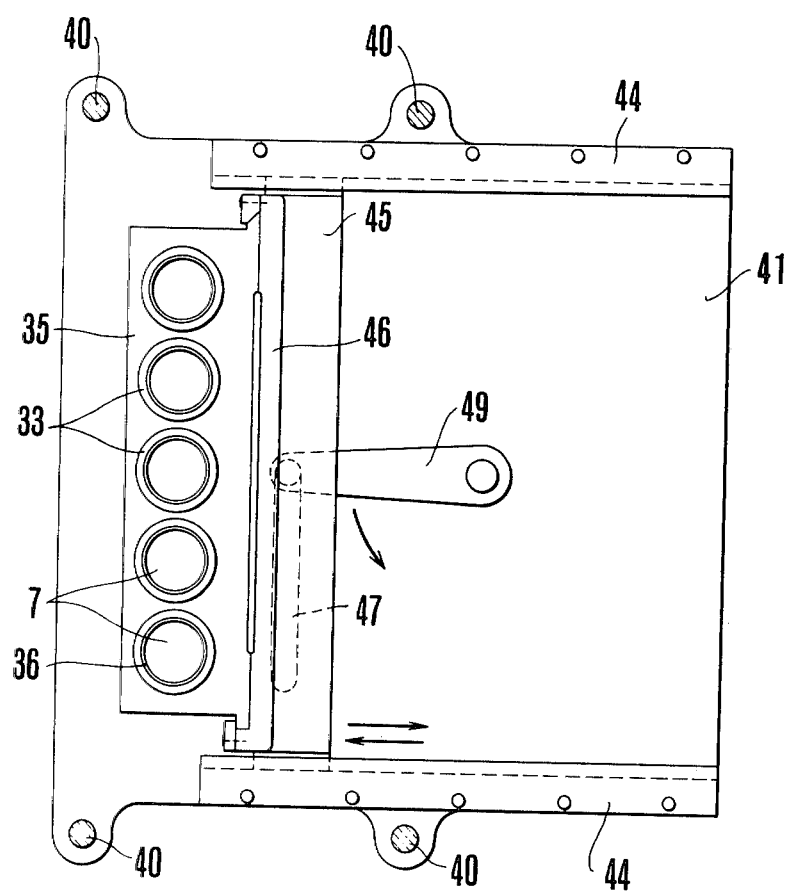
Figure 3:
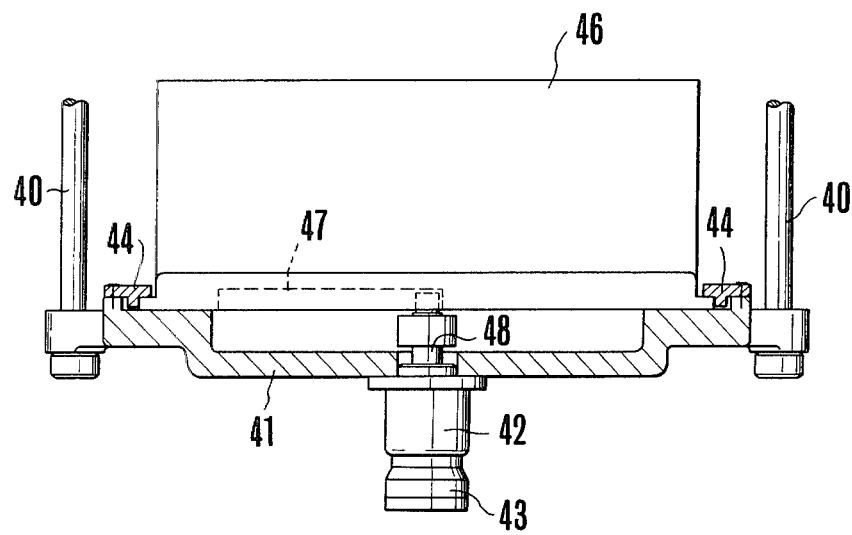
Figure 4:
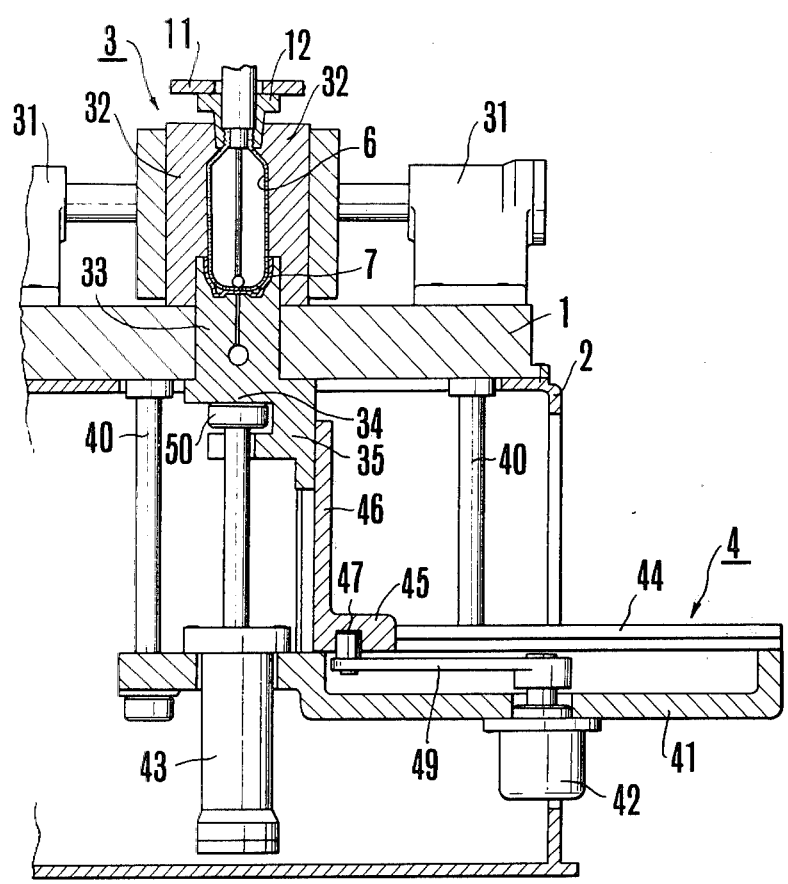
Figure 5:
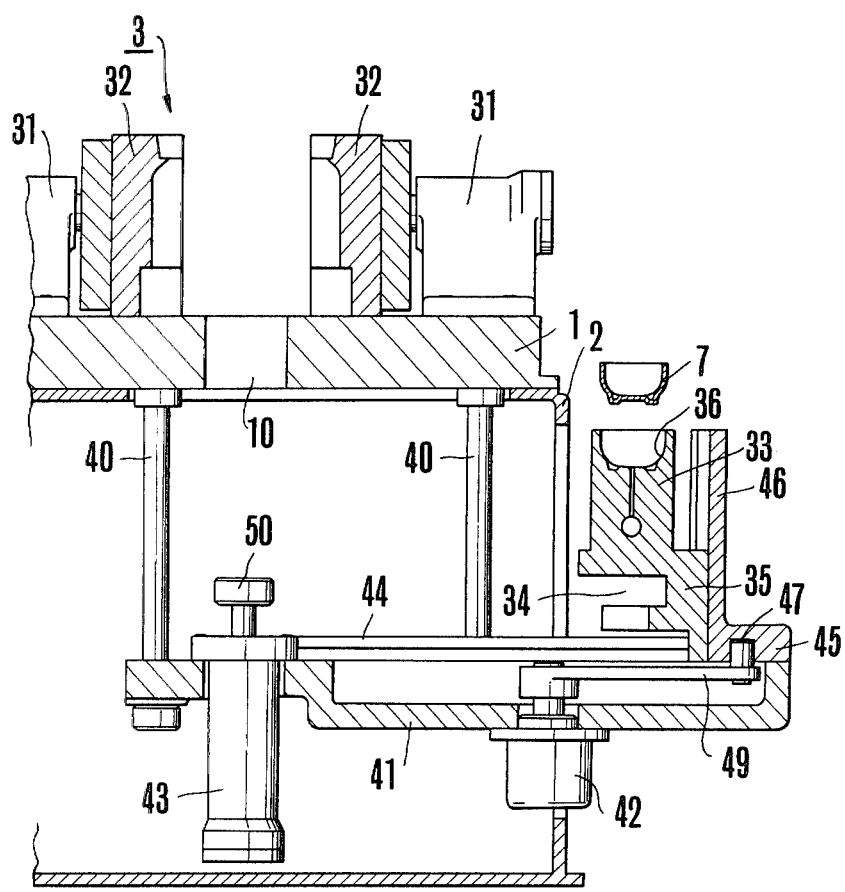

The present invention will now be described with reference to its embodiments shown in the accompanying drawings. Similar parts are shown by the same reference numerals in these drawings.

The drawings show the blow molding stage of an injection stretching blow molding machine with five cavities. The injection molding stage, the heating stage, the blow molding stage, and the mold opening stage are equidistantly spaced apart. In these drawings, numeral 1 denotes a base plate; 2, a machine base; and 3, a blow mold.

The blow mold 3 comprises a pair of divided molds 32, 32 for transversely displacing the base plate by oil hydraulic cylinders 31, 31, and a bottom mold 33 which is disposed below the divided molds 31, 31 through a hole 10 formed in the base plate 1. An injection molded parison P with a bottom, together with a neck mold 12 disposed at the lower side of a transfer plate 11 are located at the center of the blow mold 3 which is opened in the transverse direction.

In FIGS. 1 to 5, numeral 4 denotes a transfer device of the bottom mold 33 which has a drive device 42 and an oil hydraulic lifting cylinder 43 on a horizontal stationary plate 41 extending beyond the machine base 2 and suspended by rods 40. A pair of guide rails 44, 44 are mounted at both sides of the upper surface of the stationary plate 41, and a carrier 45 is interposed between these guide rails 44, 44.

A guide member 46 which supports the bottom mold 33 is formed integral with the carrier 45. One end of a crank arm 49 is secured to a rotational shaft 48 of the drive device 42 and the other end slidably engages through a pin with a transverse groove 47 formed at the bottom of the carrier. When the crank arm 49 is pivoted by the action of the drive device 42, the carrier is able to reciprocate horizontally beyond the machine base 2.

Each of the bottom molds 33, 33 has a recess 34 at its lower part for transversely receiving a joint 50 formed at the upper end of the plunger of the lifting cylinder 43. Recessed mold walls 36 are aligned on a base body 35 whose side opposite to the recess 34 slidably engages with the guide member 46 of the carrier 45. These mold walls 36 are for forming the bottom of containers 6 and thus are of the same configuration as the base cup 7. At the center of each is an air path 37 for suction.

In the embodiment which includes this bottom mold transfer device 4, the bottom mold 33 is supported by the carrier 45. When the bottom mold 33 is located immediately below the blow mold 3, the lifting cylinder 43 and the bottom mold 33 are joined so that the bottom mold 33 can be transferred outside the machine base 2 in accordance with the molding cycle of the containers 6. This means that the base cup 7 may be set freely and rapidly outside the base machine, even when the blow mold 3 is on the base plate 1 and is inaccessible, by transferring the bottom mold 33. In practice, the base cup 7 may be easily and accurately inserted in the blow mold 3, which had previously been considered impossible.

Figure 6:
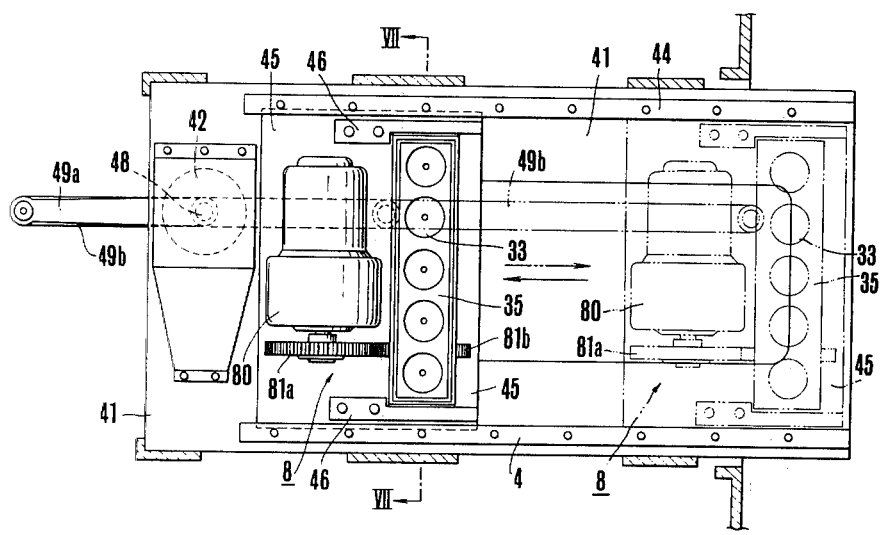
FIG. 6 is a plan view illustrating the second embodiment of the present invention.

FIGS. 6 and 7 show another embodiment of the present invention wherein the base body 35 of the bottom mold 33 is moved vertically by crank arms. A drive device 42 is disposed at the inner end of the stationary plate 41 which extends horizontally beyond the machine base 2. Crank arms 49a, 49b for reciprocally moving the carrier 45 are mounted on the rotational shaft 48 of the drive device 42 and on the carrier 45 which is set on the stationary plate 41 and which moves horizontally beyond the machine base 1 on the guide rails 44, 44 at both sides of the stationary plate.

A lifting device 8 for vertically moving the bottom mold 33 together with the base body 35 is secured on the carrier 45.

This lifting device 8 comprises gears 81a, 81b mutually engaged to be rotated by a drive device 80, and crank arms 82a, 82b which can be vertically extended or retracted.

One of these crank arms, the lower crank arm 82a, is connected to a shaft 84 of the gear 81b received by a bearing member 83 of the carrier 45. The base body 35 of the bottom mold 3 is movably connected by a pin 86 to the free end of the upper crank arm 82 the other end of which is connected to a pin 85. The base body 35 which is connected by a pin to the crank arm 82b is quite unstable in vertical movement, and it is difficult to place it in the bottom part of the blow mold 3 accurately. Therefore, guide members 46, 46 are used. These guide members are vertically disposed at both sides of the carrier 45 and are preferably used for supporting the base body 35 when the carrier 45 is displaced.

What is claimed is:

1. A device for setting a base cup in a blow mold comprising a pair of divided molds disposed on a base plate and transversely movable for opening and closing; said device further comprising:

a horizontal stationary plate secured below and fixed with respect to the base plate, a carrier arranged for reciprocal movement on said stationary plate, said stationary plate extending from a position generally below said divided molds to a position beyond said base plate for permitting movement of said carrier from said position generally below said divided molds to said position beyond said base plate, a bottom mold adapted to hold a base cup, and a lifting device for said bottom mold, said bottom mold being mounted for vertical movement on said carrier and being arranged for cooperation with said lifting device when said carrier is in said position generally below said divided molds, for lifting said bottom mold into position for cooperation with said divided molds, and being arranged to receive a base cup when in said position beyond said base plate.

2. A device for setting a base cup in a blow mold as set forth in claim 1 wherein said base plate has an aperture formed therethrough below said divided molds and said bottom mold is lifted into position for cooperation with said divided molds by said lifting device through said aperture.

3. A device for setting a base cup in a blow mold as set forth in claim 1 wherein said lifting device is secured to a portion of said stationary plate generally below said divided molds and includes a lifting member which cooperates with said bottom mold when said carrier is in said position generally below said divided molds, for lifting said bottom mold into position for cooperation with said divided molds and lowering said bottom mold therefrom.

4. A device for setting a base cup in a blow mold as set forth in claim 1 wherein said lifting device is carried on said carrier and includes a drive device for driving a crank arm, said crank arm having a free end which is vertically extended or retracted by said drive device, said bottom mold being connected to the free end of said crank arm for vertical reciprocation with respect to said carrier.

5. A device for setting a base cup in a blow mold as set forth in claim 1 wherein a carrier drive means is mounted on said stationary plate to effect horizontal reciprocation of said carrier on said stationary plate.

* * * * *